(12) United States Patent
Haynes

(10) Patent No.: US 6,447,237 B1
(45) Date of Patent: Sep. 10, 2002

(54) PIVOTING BED TRAILER

(76) Inventor: Ralph William Haynes, 711 Stayglass Dr., Fayetteville, NC (US) 28311

( * ) Notice: Subject to any disclaimer, the term of this patent is extended or adjusted under 35 U.S.C. 154(b) by 0 days.

(21) Appl. No.: 09/829,898

(22) Filed: Apr. 10, 2001

(51) Int. Cl.$^7$ ................................................. B60P 3/10
(52) U.S. Cl. ........................ 414/483; 414/482; 414/495; 414/537; 280/43.18
(58) Field of Search ................................ 414/480, 482, 414/483, 484, 485; 280/43.18, 43.11, 43.12; 254/3 R (56) References Cited

U.S. PATENT DOCUMENTS

| | | | |
|---|---|---|---|
| 3,788,675 A | * | 1/1974 | Wilander ................. 414/495 X |
| 4,032,167 A | * | 6/1977 | Chereda .................. 414/537 X |
| 4,490,089 A | * | 12/1984 | Welker ........................ 414/483 |
| 4,659,100 A | * | 4/1987 | Welker .................... 414/483 X |
| 5,308,213 A | * | 5/1994 | Gilbertson .................. 414/482 |
| 5,474,416 A | * | 12/1995 | Rogge et al. ................ 414/482 |

FOREIGN PATENT DOCUMENTS

| | | | |
|---|---|---|---|
| CA | 1288736 | * 9/1991 | ................. 414/483 |

* cited by examiner

*Primary Examiner*—Frank E. Werner
(74) *Attorney, Agent, or Firm*—Mills Law Firm PLLC (57) ABSTRACT

A pivoting bed trailer to be towed behind a motor vehicle for transporting a wheeled vehicle includes a main frame having a trailer hitch at a front end for coupling with the motor vehicle and a rearward end that engages the ground in an inclined loading condition and supported horizontally above the ground in a transporting condition. The main frame includes longitudinally extending guide rails for laterally aligning the vehicle. A pivot frame frontally and laterally bounds the main frame and the guide rails and is connected to said main frame at a transverse pivotal connection. The pivot frame includes pair of laterally spaced wheel assemblies carried by leaf spring below the pivot frame forward of the pivotal connection whereby rotation of the pivot frame about the wheels raises and lowers the transverse pivotal connection and moves the main frame between the loading condition and the transporting condition.

14 Claims, 7 Drawing Sheets

PIVOTING BED TRAILER

FIELD OF THE INVENTION

The present invention relates to towing apparatus, and, in particular, a low-level pivoting bed trailer for transporting wheeled vehicles, such as motorcycles.

BACKGROUND OF THE INVENTION

The loading onto trailers of vehicles, such as motorcycles, motorbikes, boating equipment or the like can be difficult, particularly where the vehicle is weighty and cumbersome and the trailer bed is elevated. These difficulties persist even with the use of load ramps where the vehicle is pushed up a steep incline. In additional to the work effort involved, maintaining secure control of the vehicle during movement is difficult and dangerous. In an effort to overcome the foregoing limitations, a number of low-level loading trailers have been proposed wherein linkage controlled beds may be pivoted and/or lowered to facilitate loading.

For instance, U.S. Pat. No. 5,362,195 to Wagner discloses a tilting trailer for transporting motorcycles wherein a center longitudinal carrier is pivotally supported adjacent the trailer wheels at a fixed axis permitting a user to ride a motorcycle up the downwardly tilted carrier until the center of gravity is passed and the carrier tilts downwardly to a horizontal transport position. This approach uses vehicle power to overcome the inclined angle and requires vehicle operation, a dangerous and oftentimes non-available option.

U.S. Pat. No. 4,032,167 to Cherda discloses a low-slung, fixed transport bed accessed by pivoted ramps for loading motorcycles. While reducing bed elevation the initial incline at the ramp remains significant.

U.S. Pat. No. 4,154,352 to Fowler discloses a motorcycle trailer wherein an actuating cylinder and manually operated lever arm cojointly operate a complex linkage for pivoting a motorcycle bed between a lowered and raised position.

U.S. Pat. No. 4,752,177 to Zenna discloses a motorcycle trailer apparatus wherein a trailer bed is moved between a raised and lowered position by hydraulic cylinders.

U.S. Pat. No. 5,564,883 to Swanner discloses a lever-operated pivoting bed trailer U-shaped lever frame is centrally pivoted to a wheel mounted side frame and includes a lift bar at an outer end that pivots a short carrier bed rotatably connected to a midsection of the side frame between a raised and lowered position.

U.S. Pat. No. 3,788,675 to Wilander discloses ground level loading trailer wherein a platform bed is connected at a front end to the trailer tow bar and at a rear end to a wheel mounted pivoting frame. Downwardly shifting the pivoting frame raises the tow bar and platform bed into an elevated position for securing by manual clamps. A similar linkage for raising a motorcycle trailer bed is disclosed in U.S. Pat. No. 4,490,089 to Welker.

U.S. Pat. No. 4,659,100 to Welker discloses a motorcycle trailer wherein a lever rigidly pivotally attached to the trailer wheels includes a rear lift bar for pivoting a trailer bed relative to the towing hitch between a lowered and raised position.

In view of the foregoing, it would be desirable to provide a vehicle trailer that may be readily positioned for loading a vehicle and repositioned for normal towing without encountering steep inclines and providing secure attachment of the vehicle and compliant support during transport.

SUMMARY OF THE INVENTION

The foregoing are accomplished by the present invention by a pivoting bed trailer an inclined main frame bed that is continuous the full length of the trailer from the trailer hitch to the trailer end section, with the minor transition to ground level being provided pivoting transition ramps. The main frame is resiliently supported on a pivot frame carrying leaf spring supported wheel assemblies. The pivot frame is pivotally connected to the main frame at a rearward location offset from the wheels. As the pivot frame is upwardly rotated, the pivot connection with the main frame is rotated downwardly thereby rearwardly inclined the main frame bed. With this linkage the entire length of the trailer is utilized to provide the shallowest possible ramp angle. Converging guide rails are provided on the trailer bed for guiding and aligning the towed vehicle wheels during transfer. In the loaded position, the towed vehicle may be securely strapped to the trailer for lateral stability. The leaf spring suspension provides for compliant suspension over irregular terrains.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENTS

Figure 1:
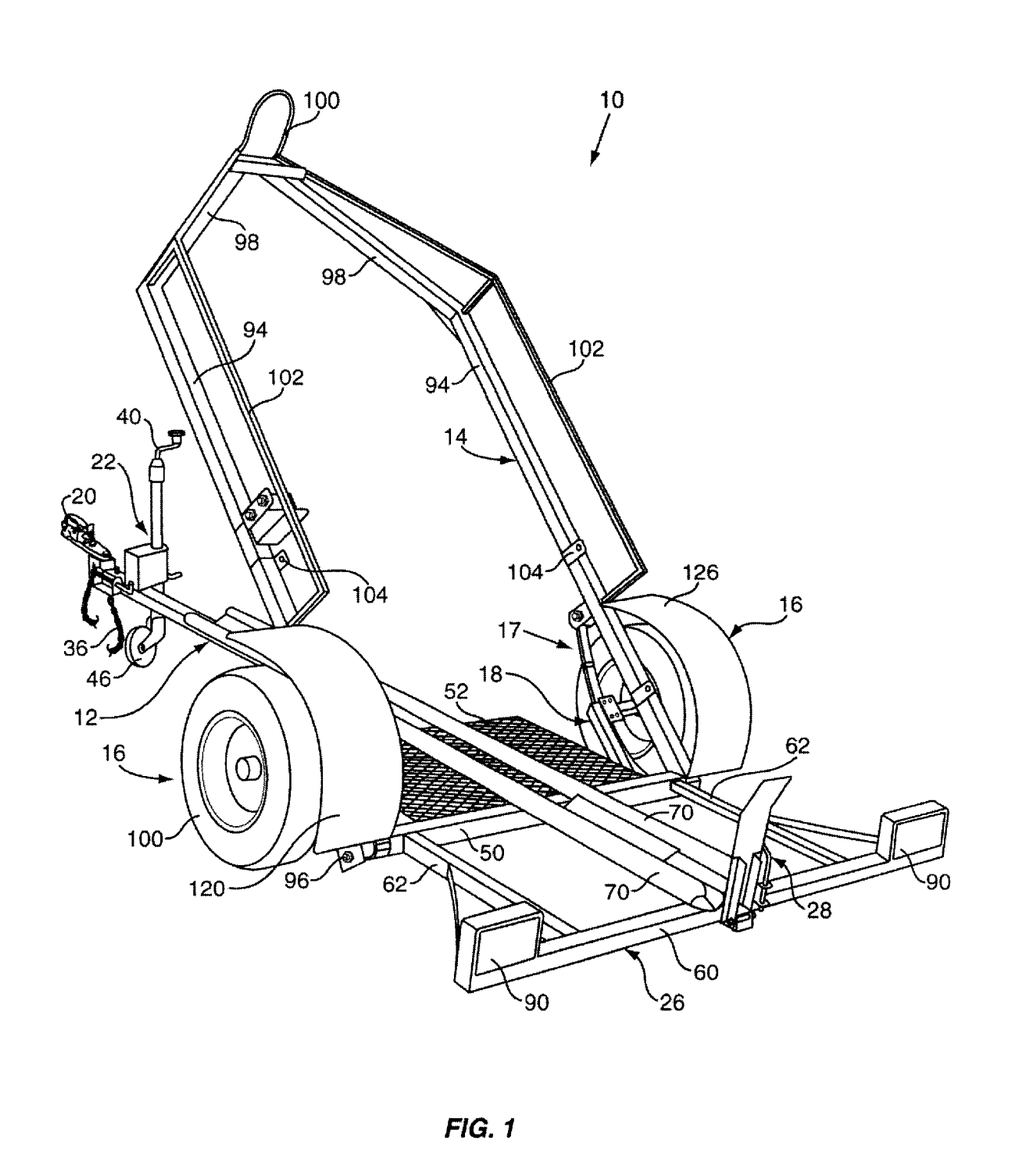
FIG. 1 is a perspective view of a pivoting bed trailer in accordance with an embodiment of the invention showing the vehicle bed in the lowered loading position.

Referring to the drawings for the purpose of describing the preferred embodiment and not for limiting same, FIG. 1 illustrates a pivoting bed trailer 10 for attachment to a conventional trailer hitch on a towing vehicle, not shown. The trailer 10 may be used for transporting a vehicle, such as a motorcycle, not shown. The trailer 10 includes a main frame 12 attachable to the vehicle and a pivot frame 14. The pivot frame 14 includes wheel assemblies 16, leaf spring units 17, and offset transaxle 18. As hereinafter described in detail, the trailer 10 may be operated from the loading position shown in FIGS. 1 and 2 for loading and unloading of the vehicle to the towing position shown in FIG. 3 for transporting the vehicle by upwardly pivoting the pivot frame 14 relative to the main frame 12.

The main frame assembly 12 includes a hitch assembly 20, a wheel lift 22, a tow bar 24, and a rear deck 26 carrying a vehicle ramp 28.

Figure 6:
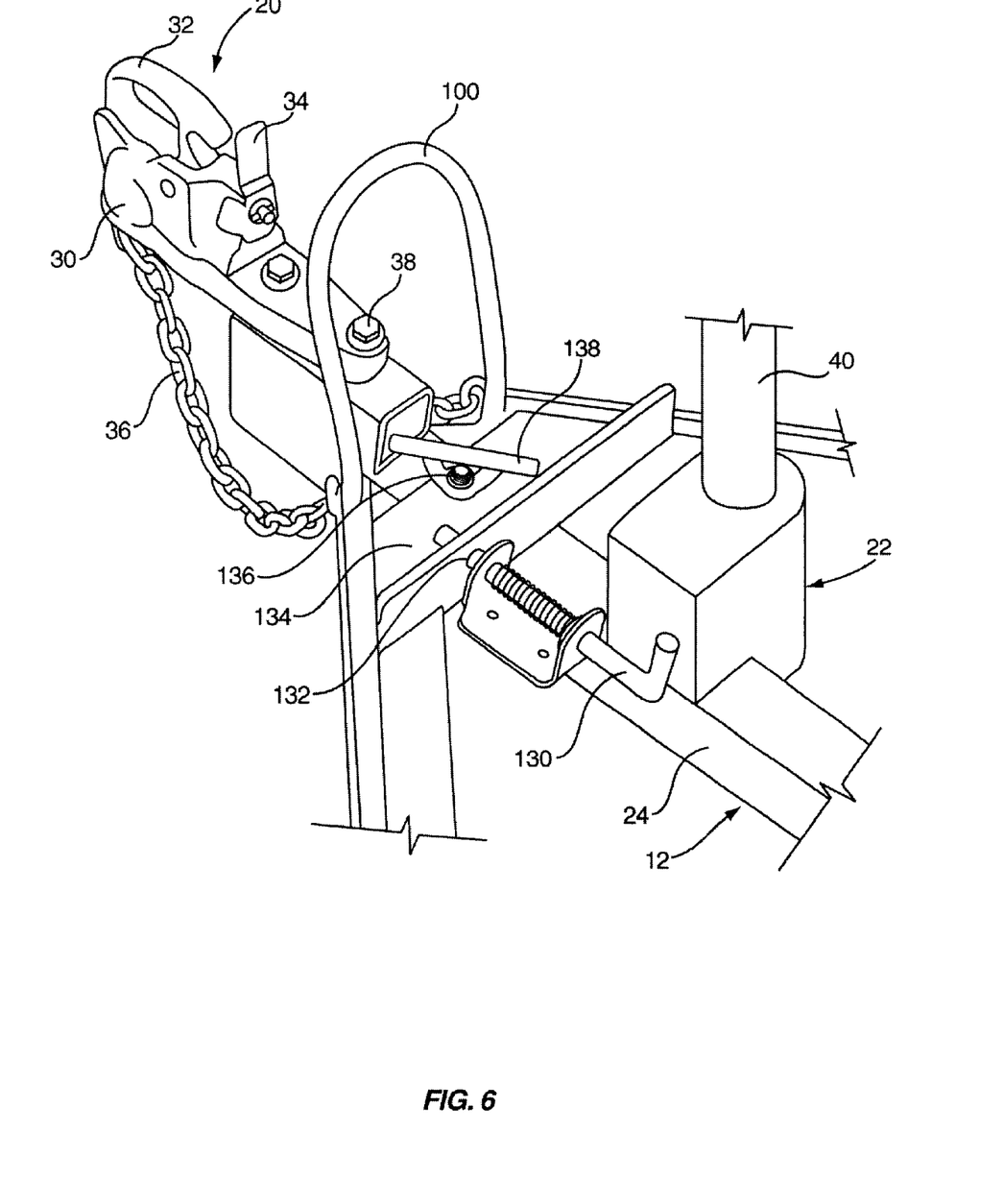
FIG. 6 is an enlarged fragmentary perspective view of the locking assembly for the pivoting bed.

The hitch assembly 20, as shown in FIG. 6, is a conventional unit having a hemispherical front section 30 including a lifting handle 32 for manually positioning over the mating ball on the towing vehicle, an adjustable locking mechanism 34 for releasably attaching the front section 30 to the hitch ball, and a safety chain 36 for fixed attachment to the towing vehicle. The tow bar 24 extends longitudinally on the main frame 12 and is mechanically connected at the front end to the hitch assembly 20 by fasteners 38. The wheel lift 22 is a commercial available screw operated mechanism and is fixedly connected to the tow bar 24 slightly rearwardly of the hitch assembly 20. The wheel lift 22 includes a crank 40, the operation of which selectively raises or lowers a pivoting support wheel 42 with respect to the main frame 12 whereby the trailer may be transported when disengaged from the towing vehicle or assist in coupling the trailer with respect thereto.

The tow bar 24 is connected at the rear end thereof to a transverse crossbar 50. A platform 52 is connected to the crossbar 50 and projects frontally therefrom. The platform 52 includes a pair of L-shaped support arms 54 connected at outer ends to the outboard ends of the cross bar 50 and inner ends to the side walls of the tow bar 24 thereby defining a generally rectangular frame to which an expanded metal panel 56 is attached. The panel 56 and platform, in addition to increasing the rigidity of the frame provides a raised surface for attending the motorcycle in use.

Figure 2:
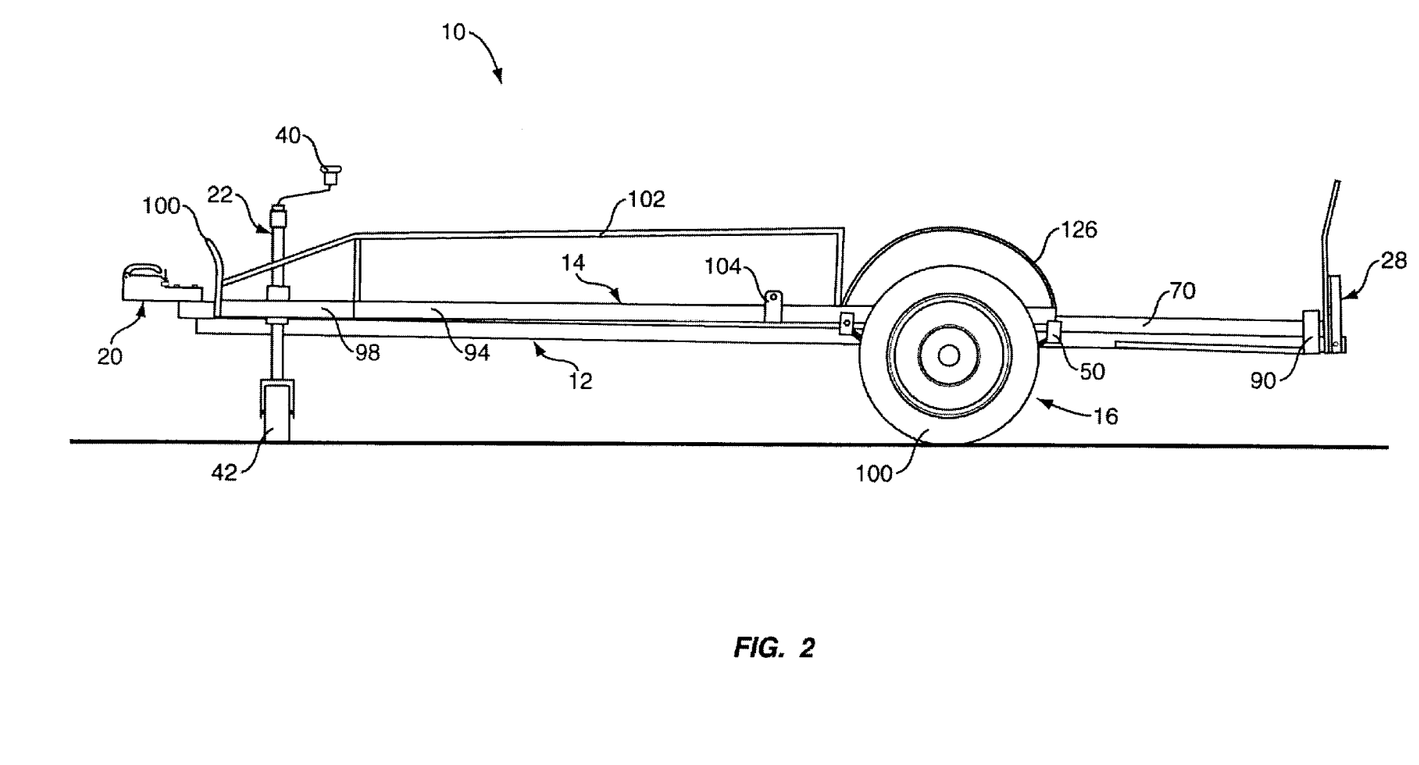
FIG. 2 is a side elevation view of the pivoting bed trailer in the raised towing position.

The rear deck 26 includes a transverse end section 60 having three laterally spaced stringers 62 connected to the cross bar 50 in alignment with the tow bar 24 and the rear ends of the support arms 54. A pair of tubular guide rails 70 are symmetrically disposed with respect to the tow bar 24 and converge inwardly toward the front thereof. The guide rails 70 are connected to the end section 60 at the rears ends and to the forward section of the tow bar 24 at the front ends by suitable weldments. The ramp 28 is connected to the end section 60 in alignment with the guide rails 70. In the lowered position of the ramp 28 as shown in FIG. 2, a motorcycle may pushed or ridden up the ramp 28 along the center stringer 62 and the tow bar 30 as laterally constrained by the guide rails 70. The convergence of the guide rails effects a compressive engagement with the sidewalls of the tires to maintain the motorcycle until suitable retaining straps can be attached. Vertically extending taillights and/or reflectors 90 are mounted at the rear section 60 for signaling and alerting following traffic.

The pivot frame 14 includes a generally U-shaped outer cradle 92 having laterally spaced side arms 94 pivotally connected at rearward ends to the outer ends of the cross bar 50 at transverse pivotal connections 96 establishing a horizontal lateral pivot axis. The side arms 94 frontally terminate at forwardly and inwardly converging arms 98 at the frontal ends connected to a vertically extending, inverted U-shaped lifting handle 100. Guard rails 102 are connected to the arms 94 and 98 for peripherally protecting the vehicles. A plurality of brackets 104 are attached to the side arms 94 to accommodate retaining straps for securing the vehicle on the trailer during transit.

The wheel assemblies 16 include a wheel 100 carried on a stub axle 112 connected to the transaxle 18. The transaxle 18 includes a pair of rearwardly extending arms 114 rotatably supporting the stub axles at the forward ends and rigidly connected to a transversely extending cross arm 118 at the rear ends. Each leaf spring unit 17 includes a plurality of stacked leaf springs 120 centrally fixed to the stub axles 114 by clamping brackets 122 and fixedly connected at distal ends to longitudinally spaced mounting brackets 124 affixed to the lower surface of the side arms 94. A hemicylindrical fender 126 connected to the side arms 94 overlies the top of each wheel 100. Accordingly, it will be appreciated that the leaf spring unit 17 provides a live suspension for the wheels 100, the lifting frame 14 and the main frame 12 for compliantly carrying the vehicle over irregular terrain.

Figure 3:
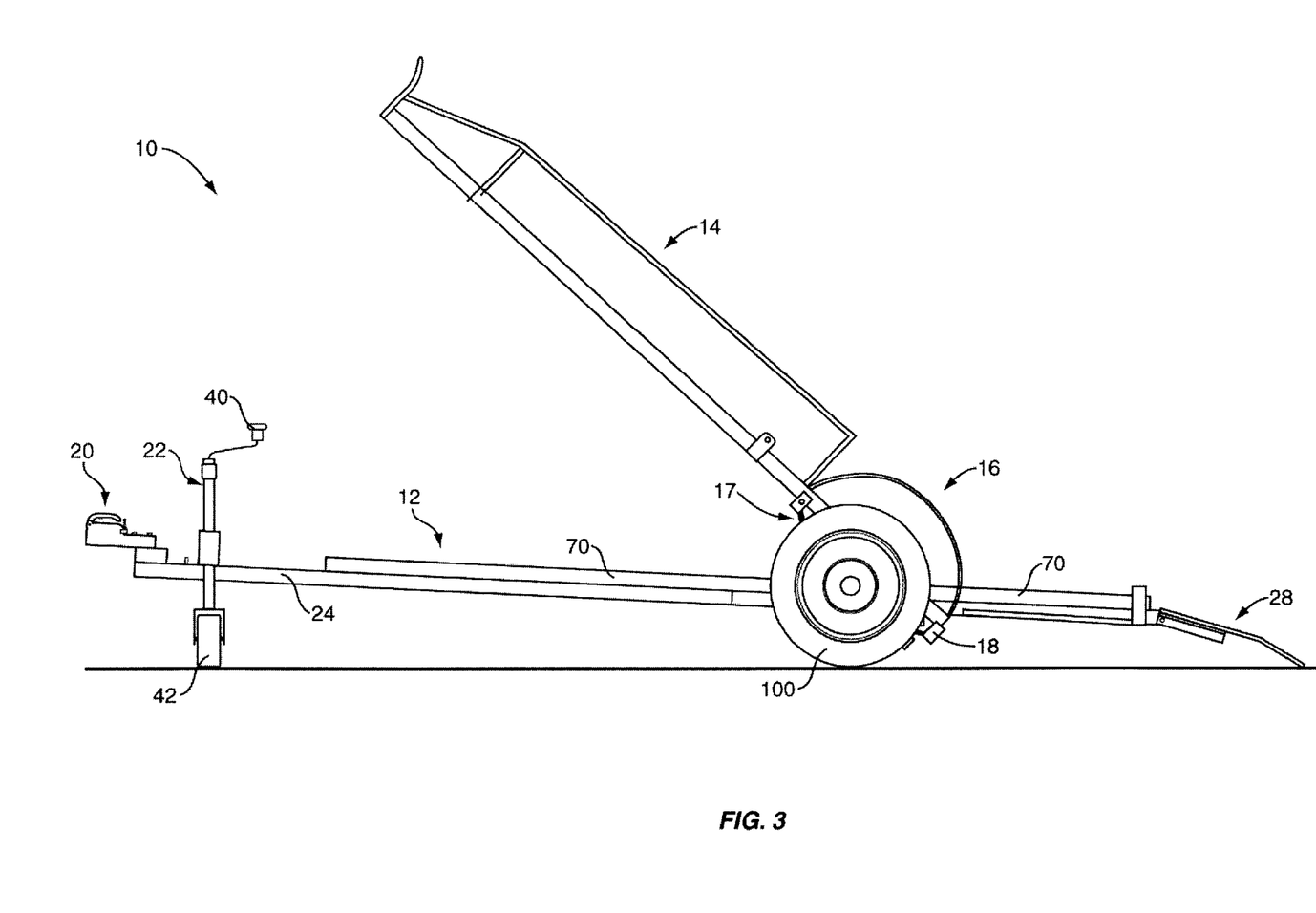
FIG. 3 is a side elevation view of the pivoting bed trailer in the lowered loading position.
Figure 4:
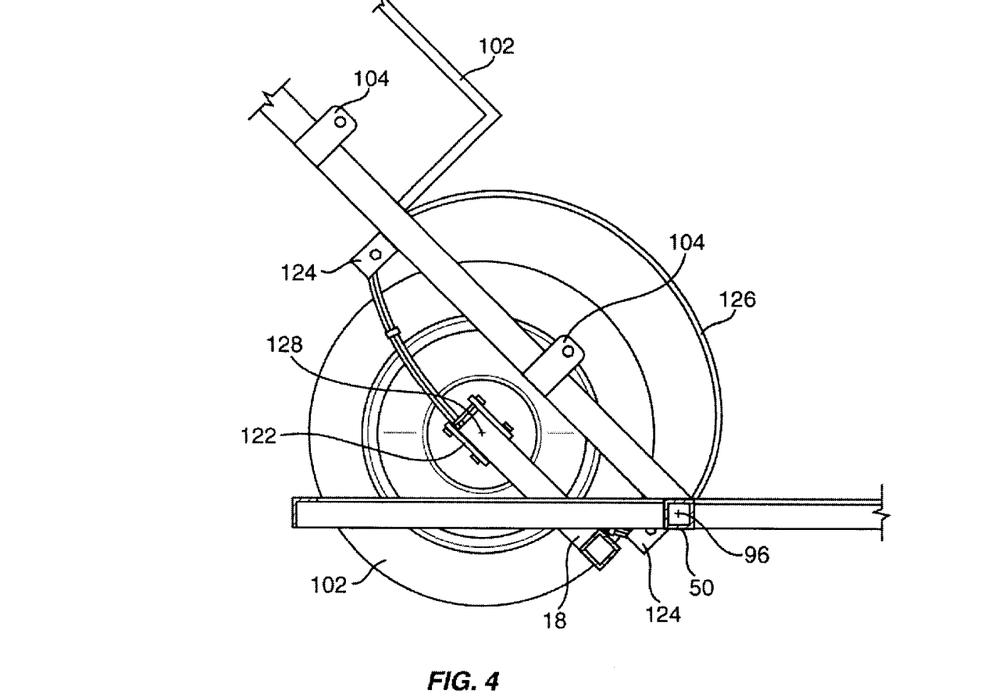
FIG. 4 is a side view taken along line 4—4 in FIG. 3 showing bed linkage and suspension assembly in the loading position.
Figure 5:
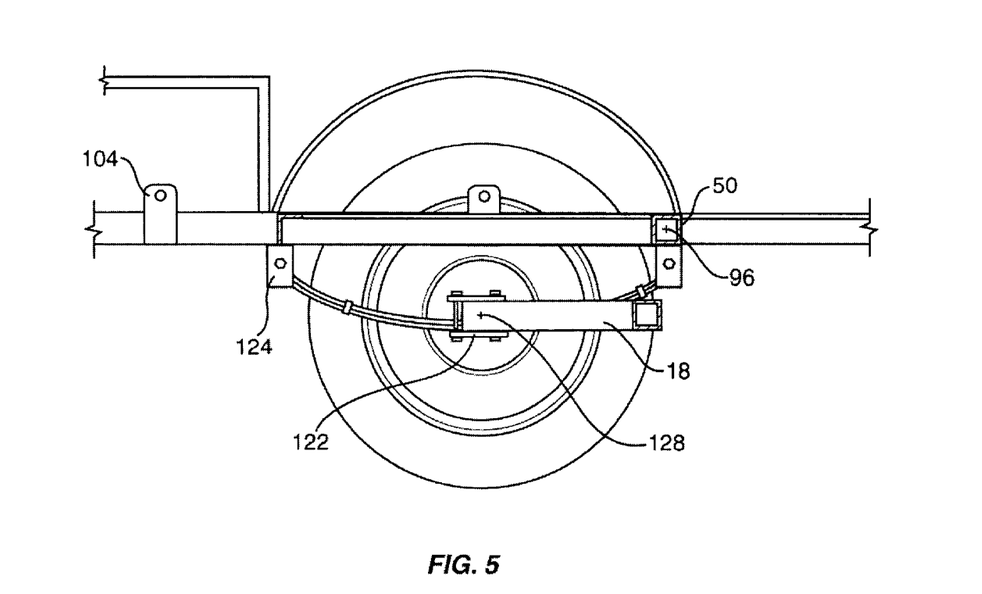
FIG. 5 is a side view taken along line 5—5 in FIG. 2 showing the bed linkage and suspension assembly in the towing position.

With the foregoing linkage, raising the pivot frame 14 between the lowered position shown in FIG. 5 and the raised position shown in FIG. 4 effects a rotation of the side arms 94 about the pivot axis 129 of the wheels and lowers the pivot connection with the cross bar. As a result the main frame and the guide rails are moved between the loading position of FIGS. 1, 3 and 4 and the towing position of FIGS. 2 and 5. A gradual incline is thus provided as the main frame pivots downwardly about the hitch 20 or the pivot wheel 46.

Figure 7:
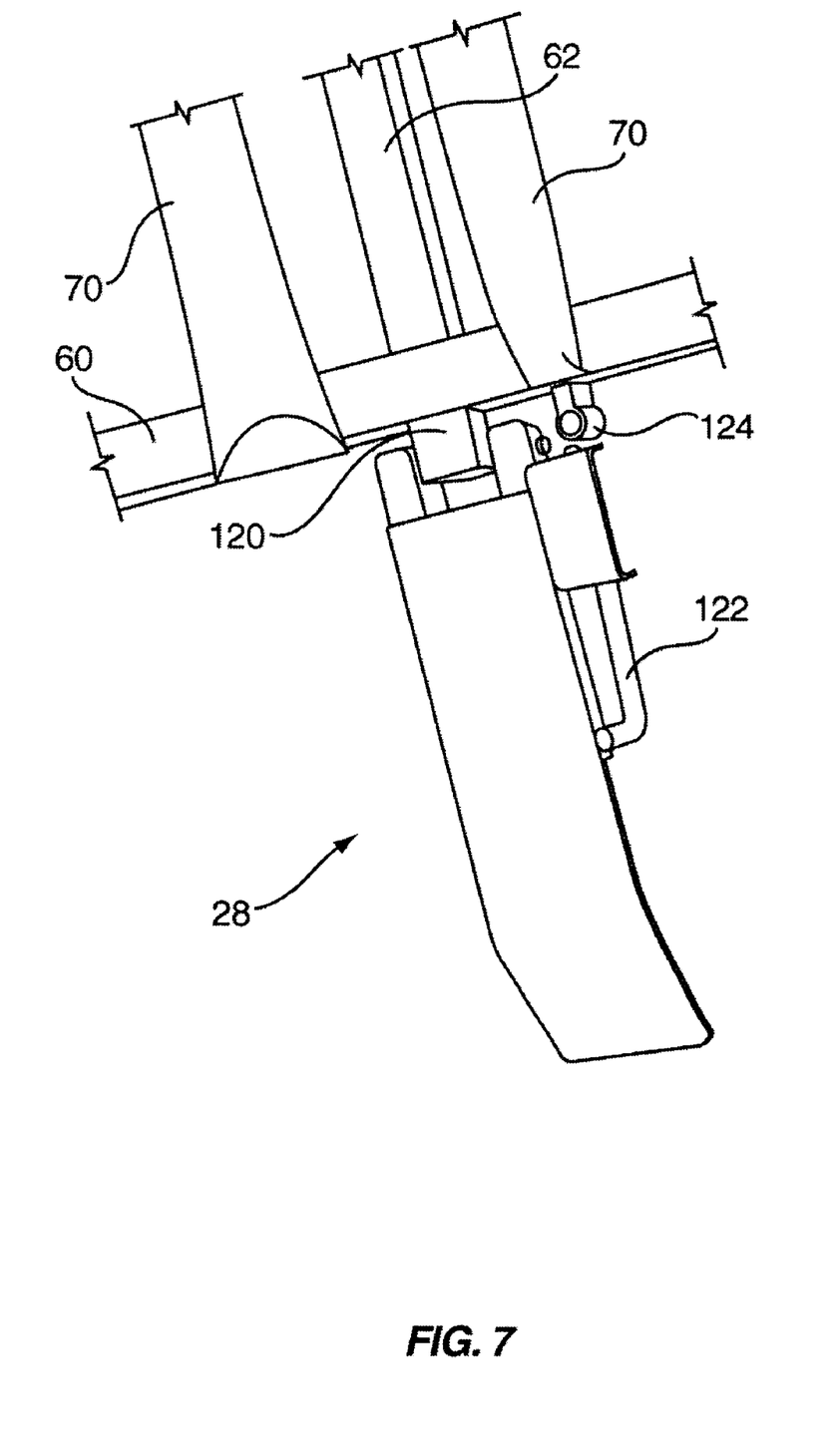
FIG. 7 is an enlarged fragmentary perspective view of the loading ramp assembly for the pivoting bed trailer.
Figure 8:
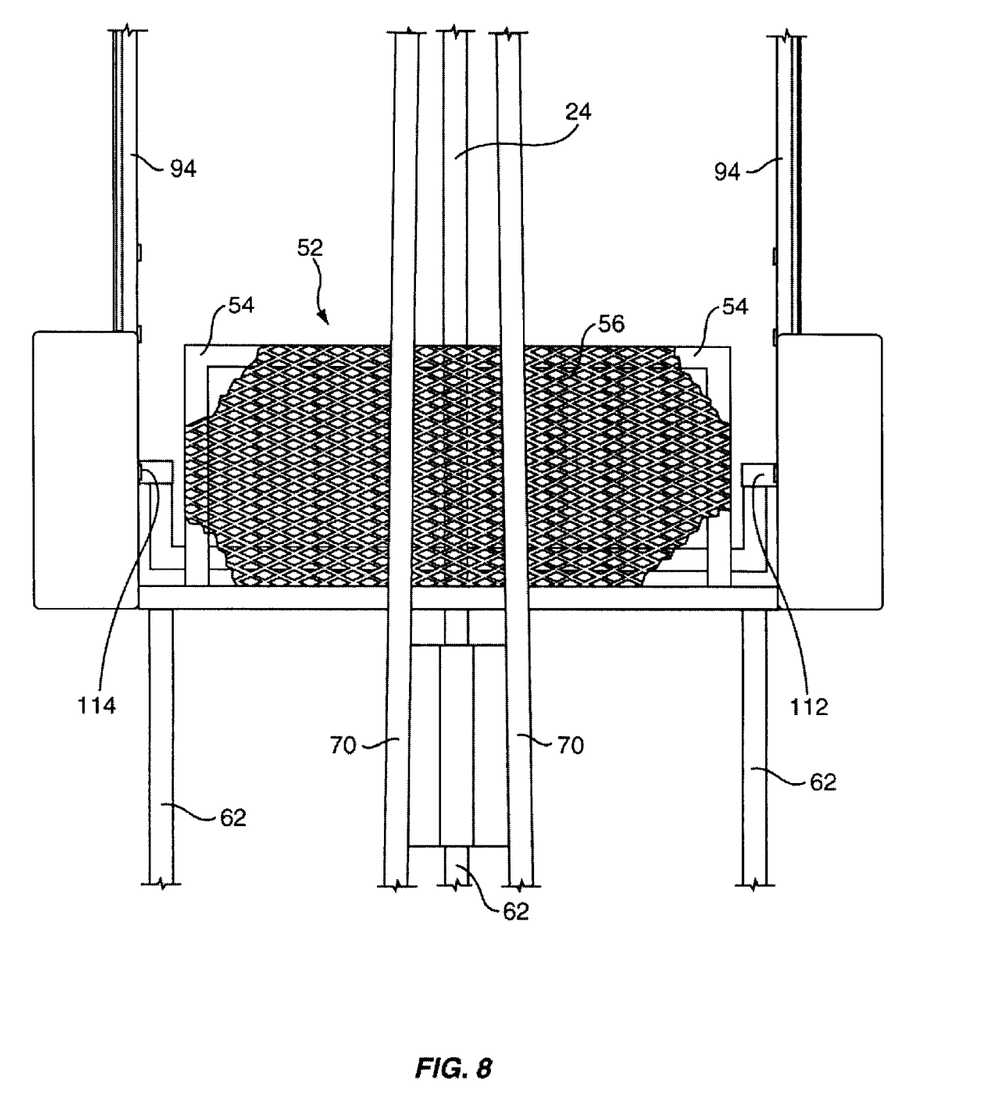
FIG. 8 is an enlarged partial top view of the pivoting bed trailer illustrating the loading platform for the pivoting bed trailer.

Referring additionally to FIG. 7, the ramp 28 is pivotally connected to a bracket 120 on the rear bar 100 and aligned between the guide rails 70 for rotation between a vertical position shown in FIG. 2 during transport and a lowered position shown in FIG. 3 for loading and unloading of the vehicle. The ramp 28 includes a spring biased lock bar 122. In the raised position, the end of the lock bar registers in an opening on a lock sleeve 124 on the end bar to secure the ramp 28 in the vertical position. For deployment, the lock bar 122 is withdrawn from the sleeve allowing the ramp 28 to lower to a grounded position to provide a continuous inclined surface onto the trailer. For loading, the motorcycle may be ridden or pushed up the ramp, aligned by the guide rails 70, and forwardly on the center stringer, the mesh platform and the tow bar 24 to the desired transport location until the convergence of the guide rails grips the tires, aligning the motorcycle on the trailer 10. Suitable straps extending to the brackets may be utilized to securely fasten the motorcycle to the trailer for transport.

When the motorcycle is properly positioned, the pivot frame 14 is pivoted downwardly, thereby raising the pivot connection 96 and the main frame 12, to the position shown in FIG. 5 thereby juxtaposing and engaging the pivot frame 14 with the main frame 12. For fixedly securing the pivot frame to the main frame, a spring biased, L-shaped locking bar 130 carried on the tow bar 24 registers with a locking aperture 132 in a front plate 134 connected between the front ends of the front arms 98. Further, a threaded stud 136 is attached to the tow bar 24 and registers with an aperture formed in the front plate 134 in the lowered position. A wing nut 138 is threaded over the stud 136 to lock the frames in the towing position.

The trailer 10 in accordance with the foregoing construction provides an extended, shallow angle, loading ramp surface for continuously supporting the wheels of the vehicle during manual or powered loading or unloading. In the lowered position, the ramping surface extends from the frontal hitch assembly 20 at vehicle elevation to ground level wherein the end section 60 engages the ground surface thereby taking advantage of the entire trailer length in establishing the shallowest possible inclination. The slight step between the trailer and ground surface is readily bridged by the ramp 28. Furthermore, supporting the main frame at a fulcrum intermediate the ends provides substantial mechanical advantage in raising and lowering the trailer under loaded and unloaded conditions. Moreover, by supporting the main frame load adjacent the leaf spring units, a highly compliant suspension is provided.

The above embodiment has been described above with reference to a trailer for transporting motorcycles and like two wheeled vehicles. However, it will be appreciated that the ramp structure may be appropriately modified to facilitate the transport other land and water vehicles. Further, multiple guide rails and ramps may be provided for carrying multiple vehicles. Additionally, guide rail set may be provided for transporting four wheeled vehicles.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A trailer to be towed behind a motor vehicle for transporting a wheeled vehicle and/or cargo, said trailer comprising: a main frame including hitching means at a forward end for coupling with the motor vehicle and a rearward end engaging the ground in a loading condition and supported above the ground in a transporting condition, said main frame including longitudinally extending guide means for laterally aligning the vehicle thereon; a pivot frame frontally and laterally bounding said guide means, said pivot frame having laterally spaced side arms connected to said main frame intermediate said hitching means and said rearward end at a transverse pivotal connection; a pair of laterally spaced wheel assemblies; a U-shaped rigid transaxle having forwardly projecting arms fixedly connected to said axle stubs, a leaf spring assembly having distal ends connected to a lower surface of said side arms of said pivot frame and a center section connected to said axle stub whereby rotation of said pivot frame about said wheels raises and lowers said transverse pivotal connection and moves said main frame between said loading condition and said transporting condition; and locking means selectively operative between said main frame and said pivot frame for maintaining said transporting condition.

2. The trailer as recited in claim 1 including ramp means pivotally connected to said rear end aligned with said guide means for providing a transition surface between said main frame and the ground during loading and unloading of the vehicle.

3. The trailer as recited in claim 2 wherein said ramp means include releasable latching means for maintaining said ramp means in a raised position in said transporting condition.

4. The trailer as recited in claim 1 wherein said distal ends of said leaf springs are connected to said pivot frame at front and rear brackets.

5. The trailer as recited in claim 4 wherein said rear brackets are adjacent said transverse pivotal connection.

6. The trailer as recited in claim 1 including wheeled lifting means for adjustably maintaining said main frame in said transporting condition when said trailer is detached from said motor vehicle.

7. The trailer as recited in claim 1 wherein said guide means includes a pair of laterally spaced longitudinally extending rails.

8. The trailer as recited in claim 7 wherein said rails are tubular.

9. The trailer as recited in claim 8 wherein said rails inwardly converge from said rear section toward said hitching means.

10. The trailer as recited in claim 9 wherein said pivot frame includes upwardly extending guard rails.

11. The trailer as recited in claim 1 wherein locking means includes a first locking device carried by said main frame and selectively engagable with said pivot frame to prevent relative movement therebetween.

12. The trailer as recited in claim 11 wherein said locking means includes a second locking device for preventing relative movement between said main frame and said pivot frame.

13. The trailer as recited in claim 1 wherein said main frame includes a platform forward of said transverse pivotal connection.

14. The trailer as recited in claim 13 wherein said platform is an expanded metal panel.

* * * * *